US012582870B2

(12) United States Patent
Xu et al.

(10) Patent No.: US 12,582,870 B2
(45) Date of Patent: Mar. 24, 2026

(54) ESTIMATING SPIN RATE AND AXIS OF A BALL USING DEEP LEARNING

(71) Applicant: RAPSODO PTE. LTD., Singapore (SG)

(72) Inventors: Dejiang Xu, Singapore (SG); Kelvin Yeo Soon Keat, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 214 days.

(21) Appl. No.: 18/668,314

(22) Filed: May 20, 2024

(65) Prior Publication Data

US 2025/0352851 A1     Nov. 20, 2025

(51) Int. Cl.
*A63B 24/00* (2006.01)
*A63B 69/36* (2006.01)
*G06T 7/20* (2017.01)

(52) U.S. Cl.
CPC ...... *A63B 24/0021* (2013.01); *A63B 24/0006* (2013.01); *A63B 69/3623* (2013.01); *A63B 69/3658* (2013.01); *G06T 7/20* (2013.01); *A63B 2024/0034* (2013.01); *A63B 2220/05* (2013.01); *A63B 2220/35* (2013.01); *A63B 2220/807* (2013.01); *G06T 2207/10016* (2013.01); *G06T 2207/20081* (2013.01); *G06T 2207/20084* (2013.01); *G06T 2207/30224* (2013.01)

(58) Field of Classification Search
CPC ............ A63B 24/0021; A63B 24/0006; A63B 2220/05; A63B 2220/35; A63B 2220/807;

A63B 2024/0034; A63B 69/3623; A63B 69/3658; G06T 7/20; G06T 2207/10016; G06T 2207/20081; G06T 2207/20084; G06T 2207/30224
See application file for complete search history.

(56) References Cited

U.S. PATENT DOCUMENTS

| | | | | |
|---|---|---|---|---|
| 5,846,086 | A * | 12/1998 | Bizzi .................. | A63B 71/0622 |
| | | | | 482/902 |
| 6,241,622 | B1 * | 6/2001 | Gobush .............. | A63B 69/3614 |
| | | | | 473/223 |
| 6,488,591 | B1 * | 12/2002 | Gobush .................. | G01S 11/12 |
| | | | | 473/409 |
| 6,500,073 | B1 * | 12/2002 | Gobush .................. | G01S 17/18 |
| | | | | 434/252 |
| 6,758,759 | B2 * | 7/2004 | Gobush .............. | A63B 69/3658 |
| | | | | 473/131 |

(Continued)

*Primary Examiner* — William H McCulloch, Jr.
(74) *Attorney, Agent, or Firm* — Fish & Richardson P.C.

(57) ABSTRACT

Embodiments are disclosed for determining a spin rate and axis of a ball using deep learning. In some embodiments, a method comprises: training a deep learning network on training images of spinning balls, each spinning ball having at least one feature point in a time series that forms a two-dimensional (2D) ellipse image in a 2D plane; capturing, with at least one camera, a series of images of a ball; predicting, with the trained deep learning network, spin measurements associated with the ball based on the series of images; determining a spin rate of the ball based on the spin measurements; determining coefficients of a 2D ellipse model based on the spin measurements and the spin rate; and determining, with the at least one processor, a spin axis of the ball in 3D space based on the 2D ellipse model and the spin rate.

20 Claims, 5 Drawing Sheets

500

(56)　　　　　References Cited

U.S. PATENT DOCUMENTS

| | | | | |
|---|---|---|---|---|
| 7,086,955 B2* | 8/2006 | Gobush | ............. | A63B 24/0021 |
| | | | | 473/409 |
| 8,189,857 B2* | 5/2012 | Johnson | ............ | A63B 71/0605 |
| | | | | 382/106 |
| 8,704,888 B2* | 4/2014 | Nakagome | ............. | G06T 7/246 |
| | | | | 348/135 |
| 9,697,613 B2* | 7/2017 | Tofolo | ...................... | G06T 7/20 |
| 10,775,492 B2* | 9/2020 | Johnson | ............... | G01S 13/878 |
| 11,615,540 B2* | 3/2023 | Jayaram | ................. | G06T 7/251 |
| | | | | 382/103 |
| 11,673,029 B2* | 6/2023 | Tuxen | ................... | A63B 43/06 |
| | | | | 473/569 |
| 11,918,863 B1* | 3/2024 | Caterina | ............. | A63B 37/005 |
| 11,995,846 B2* | 5/2024 | Forsgren | ................ | G06T 7/292 |
| 12,036,441 B2* | 7/2024 | Gopalakrishnan | ........................... | |
| | | | | A63B 69/0015 |
| 12,285,656 B1* | 4/2025 | Caterina | ............ | A63B 37/0076 |
| 12,299,082 B2* | 5/2025 | Mittal | .................... | G06N 3/096 |
| 12,361,570 B2* | 7/2025 | Forsgren | ................. | G06T 7/292 |
| 2003/0103684 A1* | 6/2003 | Gobush | .................. | A63B 71/06 |
| | | | | 382/286 |
| 2016/0350922 A1* | 12/2016 | Tofolo | ...................... | G06T 7/97 |
| 2017/0069103 A1* | 3/2017 | Gren | ................. | H04N 23/6812 |
| 2018/0005385 A1* | 1/2018 | Suk | .......................... | G06T 7/246 |
| 2021/0220718 A1* | 7/2021 | Tuxen | ............... | A63B 69/3623 |
| 2022/0138969 A1* | 5/2022 | Forsgren | ............. | G06V 20/647 |
| | | | | 382/103 |
| 2022/0343514 A1* | 10/2022 | Jayaram | .................. | G06T 7/251 |
| 2024/0123314 A1* | 4/2024 | Rockey | ............ | A63B 69/3623 |
| 2024/0157218 A1* | 5/2024 | Chang | .................... | G06T 7/246 |
| 2024/0420346 A1* | 12/2024 | Messina | ................. | G06T 7/251 |
| 2025/0161750 A1* | 5/2025 | Xu | .................... | A63B 24/0021 |
| 2025/0352851 A1* | 11/2025 | Xu | .................... | A63B 24/0021 |
| 2025/0360356 A1* | 11/2025 | Xu | ........................ | G06T 3/4046 |

* cited by examiner

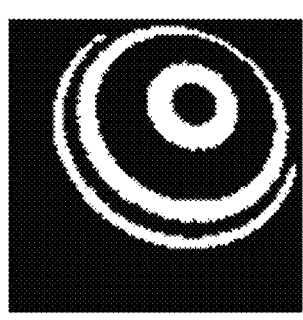

FIG. 2

INPUTS: 8 IMAGES
IN SEQUENCE

301

302

DEEP NEURAL NETWORK

| | | |
|---|---|---|
| | $Conv_{32X32X1}$ - Relu | $Conv_{128X128X1}$ - Relu |
| $Conv_{8X16X1}$ - Relu | $Conv_{32X32X1}$ - Relu | $Conv_{128X128X1}$ - Relu |
| $Conv_{16X16X1}$ - Relu | $Conv_{32X64X2}$ - Relu | $Conv_{128X256X1}$ - Relu |
| $Conv_{16X16X1}$ - Relu | $Conv_{64X64X1}$ - Relu | $Conv_{256X256X1}$ - Relu |
| $Conv_{16X16X1}$ - Relu | $Conv_{64X64X1}$ - Relu | $Conv_{256X256X1}$ - Relu |
| $Conv_{16X32X2}$ - Relu | $Conv_{64X64X1}$ - Relu | $Conv_{256X512X2}$ - Relu |
| $Conv_{32X32X1}$ - Relu | $Conv_{64X128X2}$ - Relu | $Conv_{512X1024X1}$ - Relu |

FULLY CONNECTED LAYER

OUTPUTS

- SPIN MEASUREMENTS: $(S_x, S_y, S_z)$
- SPIN CONFIDENCE: P

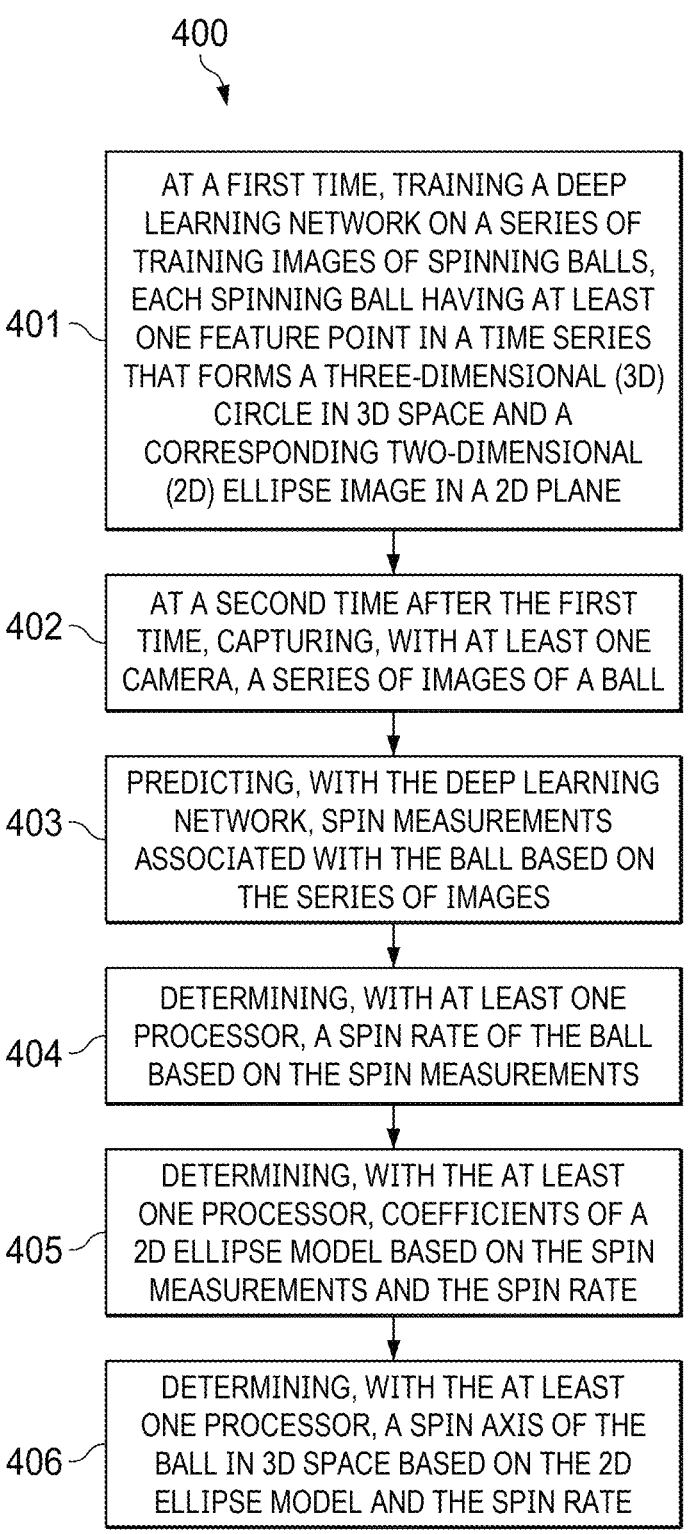

401 — AT A FIRST TIME, TRAINING A DEEP LEARNING NETWORK ON A SERIES OF TRAINING IMAGES OF SPINNING BALLS, EACH SPINNING BALL HAVING AT LEAST ONE FEATURE POINT IN A TIME SERIES THAT FORMS A THREE-DIMENSIONAL (3D) CIRCLE IN 3D SPACE AND A CORRESPONDING TWO-DIMENSIONAL (2D) ELLIPSE IMAGE IN A 2D PLANE

402 — AT A SECOND TIME AFTER THE FIRST TIME, CAPTURING, WITH AT LEAST ONE CAMERA, A SERIES OF IMAGES OF A BALL

403 — PREDICTING, WITH THE DEEP LEARNING NETWORK, SPIN MEASUREMENTS ASSOCIATED WITH THE BALL BASED ON THE SERIES OF IMAGES

404 — DETERMINING, WITH AT LEAST ONE PROCESSOR, A SPIN RATE OF THE BALL BASED ON THE SPIN MEASUREMENTS

405 — DETERMINING, WITH THE AT LEAST ONE PROCESSOR, COEFFICIENTS OF A 2D ELLIPSE MODEL BASED ON THE SPIN MEASUREMENTS AND THE SPIN RATE

406 — DETERMINING, WITH THE AT LEAST ONE PROCESSOR, A SPIN AXIS OF THE BALL IN 3D SPACE BASED ON THE 2D ELLIPSE MODEL AND THE SPIN RATE

FIG. 4

ESTIMATING SPIN RATE AND AXIS OF A BALL USING DEEP LEARNING

TECHNICAL FIELD

This disclosure relates generally to sports technologies and data analytics, and in particular to estimating spin rate and axis of a moving ball.

BACKGROUND

Data-driven sports technologies and data analytics help players and coaches better understand performance through reliable data. One such sports technology is using sensors, such as a camera and/or radar, to measure a trajectory and various parameters of a moving ball. Two parameters of interest are the spin axis and the spin rate of the ball about the spin axis. Understanding the spin axis and spin rate of the ball holds significant value, particularly in sports like golf. Knowing these parameters enables a monitoring system to calculate parameters of interest, such as the ball's trajectory and flight path, which offer valuable insights into a golfer's performance.

One approach to determining the spin axis and spin rate involves employing fixed markers on the ball. Utilizing radar and/or camera technology, these fixed markers aid in estimating the spin axis and spin rate. This approach, however, is rigid and adds extra expenses for users since they must acquire specially marked balls.

SUMMARY

Embodiments are disclosed for estimating spin rate and axis of a ball using deep learning.

In some embodiments, a method comprises: at a first time, training a deep learning network on a series of training images of spinning balls, each spinning ball having at least one feature point in a time series that forms a three-dimensional (3D) circle in 3D space and a corresponding two-dimensional (2D) ellipse image in a 2D plane; at a second time after the first time, capturing, with at least one camera, a series of images of a ball; predicting, with the trained deep learning network, spin measurements associated with the ball based on the series of images; determining, with at least one processor, a spin rate of the ball based on the spin measurements; determining, with the at least one processor, coefficients of a 2D ellipse model based on the spin measurements and the spin rate; and determining, with the at least one processor, a spin axis of the ball in 3D space based on the 2D ellipse model and the spin rate.

In some embodiments, the spin rate is computed from a norm of the spin measurements.

In some embodiments, the trained deep learning network generates a spin confidence score associated with the spin measurements.

In some embodiments, the deep learning network comprises n units, each unit including a convolutional filter followed by an activation function, and a fully connected layer for outputting the spin measurements and the spin confidence.

In some embodiments, the activation function is a rectified linear unit (ReLU).

In some embodiments, the training images include different types of balls having different spin rates.

In some embodiments, the training images are augmented by at least one of color, contrast, brightness, sharpness, shift or noise level, non-uniform lighting or complex backgrounds.

In some embodiments, at least one of the training images is randomly augmented.

In some embodiments, the at least one feature point is a dot, scratch, dimple or seam on the ball.

In some embodiments, the method further comprises: creating a 2D ellipse image from the series of images; and inputting the 2D ellipse image into the trained deep learning network.

Other embodiments are directed to a system, apparatus and computer-readable medium.

Particular embodiments described herein provide one or more of the following advantages. The disclosed embodiments provide an end-to-end spin measurement solution that uses a deep learning network to estimate spin measurements. The disclosed embodiments provide a less rigid and less expensive solutions than previous methods that use special stickers on the ball and feature extraction and matching techniques that are complex and time consuming.

BRIEF DESCRIPTION OF THE DRAWINGS

FIG. 2 illustrates points on the ball forming ellipses in a 2D image of the ball, according to one or more embodiments.

FIG. 3 is a block diagram of a deep learning network 300 that outputs ball spin rate and axis measurements, according to one or more embodiments.

FIG. 4 is a flow diagram of a process for estimating spin axis and rate with deep learning, according to one or more embodiments.

DETAILED DESCRIPTION

Figures 1A, 1B:
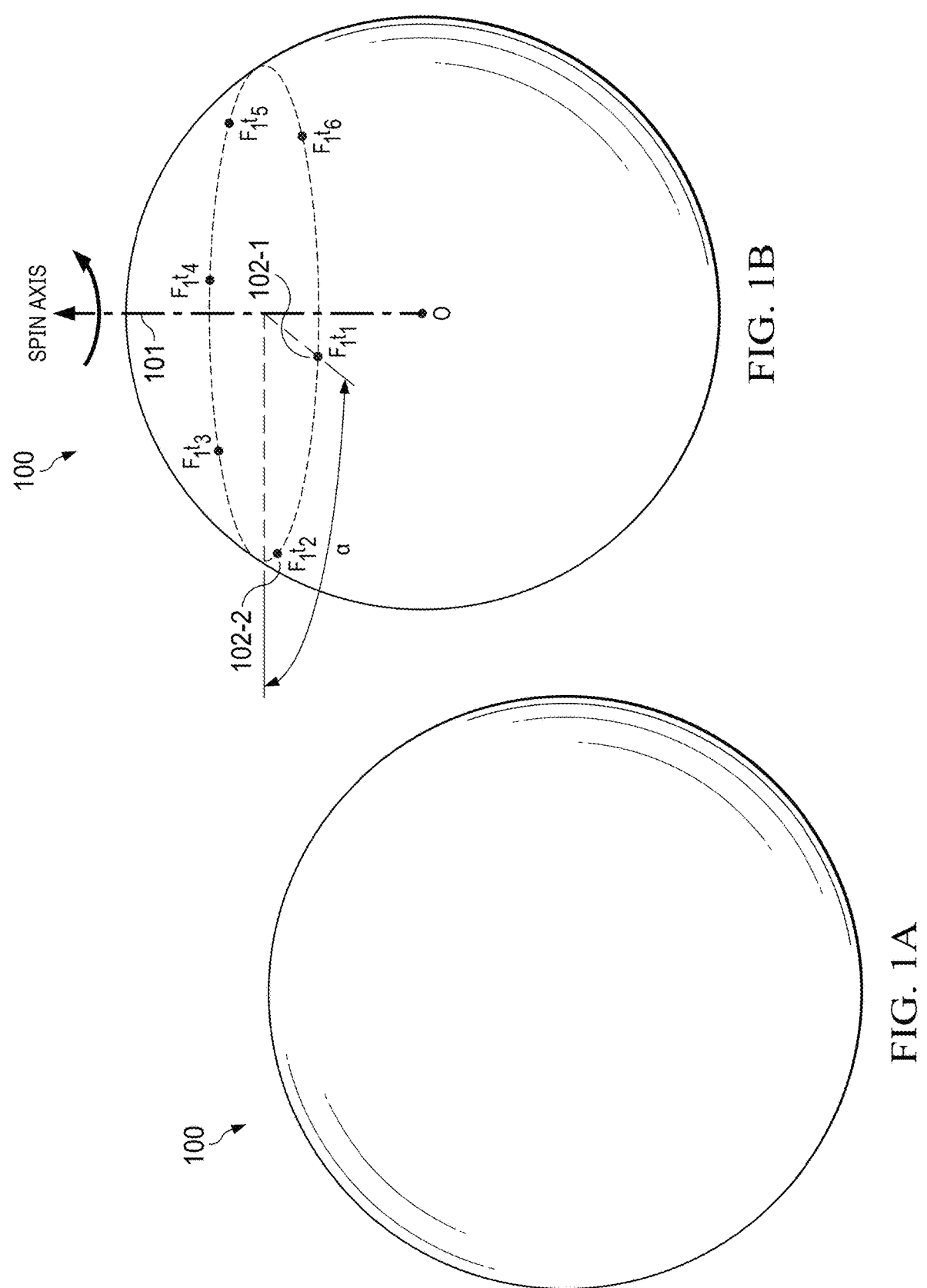
FIG. 1A illustrates a ball, according to one or more embodiments.
FIG. 1B illustrates a path taken by a feature point of the ball in 3D space as the ball rotates about its spin axis, according to one or more embodiments.

FIG. 1A illustrates a ball 100, according to one or more embodiments. The ball 100 may be a cricket ball, baseball, softball, tennis ball, ping-pong ball, football, as long as the ball has any recognizable feature (e.g., a seam, dot(s), scratch, or dimple). The feature may include, e.g., the intensity difference in a 2D image.

FIG. 1B illustrates a path taken by a feature point 102 of the ball 100 in 3D space as the ball 100 rotates about its spin axis 101, according to one or more embodiments. In the example shown, a feature point $F_j$ of a ball 100 is captured by a camera at different times $t_i$ as the ball 100 rotates about its spin axis 101, where the subscript j is a positive integer value that indicates the feature number, and the i subscript is an a positive integer value that indicates the time point. As the ball 100 rotates, feature point $F_j$ forms a 3D circle plane that is perpendicular to the spin axis as shown in FIG. 1B, where the angular distance, $\alpha$, of the feature point $F_j$ as it rotates about the spin axis and is of equidistance between successive time points $t_i$. This allows the determination of the spin rate and spin axis of the ball 100 having the recognizable feature(s) above using two feature points, such as, e.g., feature points 102-1, 102-2 and the angular distance, $\alpha$, therebetween. Although the current exemplary embodiment requires two feature points 102-1 and 102-2, the method disclosed herein requires minimally one recognizable feature point.

FIG. 2 illustrates feature points on the ball 100 forming ellipses in 2D image of the ball, according to one or more embodiments. As the ball 100 rotates, any feature point $F_j$ will form a corresponding 2D ellipse as shown in FIG. 2. Assuming i sequential images of a ball, the i-th ball is captured by the camera at time $t_i$, and the corresponding j-th feature point $F_j$ at time $t_i$ is $F_{ji}=(x_{ji},y_{ji},z_{ji})$, where $$x_{ji}^2 + y_{ji}^2 + z_{ji}^2 = 1.$$

Let the spin axis be, $V=(a,b,c)$, where $a^2+b^2+c^2=1$, then the 3D plane formed by feature point F; can be expressed as follows:

$$a*x_{ji} + b*y_{ji} + c*z_{ji} + d = 0, i = 1, 2, \ldots N, \quad [1]$$

where d is the distance of the 3D plane from the origin.

The 2D ellipse can be expressed as below:

$$(a^2 + b^2)*x_{ji}^2 + (b^2 + c^2)*z_{ji}^2 + \quad [2]$$
$$2*a*x_{ji} + 2*c*z_{ji} + 2*a*c*x_{ji}*z_{ji} + 1 - b^2 = 0$$

Therefore, the spin axis of the ball can be obtained with ellipse fitting and the spin rate of the ball about the spin axis can be obtained by determining a ratio of the angle, a, and a time difference given by:

$$\text{spin rate} = \frac{\alpha}{t_2 - t_1} \quad [3]$$

From Equations [2] and [3], both spin rate and spin axis can be measured. However, feature extraction and matching are very challenging and time consuming. Accordingly, an end-to-end spin measurement is introduced herein, where the method uses a deep learning network to estimate spin measurements is described below in reference to FIG. 3.

FIG. 3 is a block diagram of a deep learning network 302 that outputs ball spin rate and axis measurements, according to one or more embodiments. The inputs 301 to the deep neural network 302 are a number of ball images in sequence, $im_i$, where $i \geq 2$ i.e. at least two ball images in sequence are required, and the outputs are a 3D spin measurement vector $(S_x,S_y,S_z)$ and corresponding spin confidence score, P, where $0 \leq P \leq 1$. Suppose the spin axis is $V=(a,b,c)$ and the spin rate is R, then these parameters can be estimated using the spin measurement vector $(S_x,S_y,S_z)$ and the spin rate R (computed as a norm of the spin measurement vector), as follows:

$$R = \sqrt{S_x^2 + S_y^2 + S_z^2}, \quad [4]$$
$$a = S_x/R, b = S_y/R, c = S_z/R. \quad [5]$$

In the example shown in FIG. 3, the input layer 301 of the deep learning network 302 receives a sequence of 8 images with a ball size of 80×80 pixels, and the output layer provides the spin measurement and spin measurement confidence score $(S_x,S_y,S_z,P)$. In this example, the deep learning neural network 302 is a convolutional neural network (CNN) that includes convolution layer comprising 20 units, where each unit includes a convolutional filter followed by one activation function. The output layer is a fully connected layer that includes four nodes, representing three components of a spin measurement $(S_x,S_y,S_z)$ and a spin confidence score P i.e. $(S_x,S_y,S_z,P)$. Note that the output layer may include a Softmax function for generating the confidence score P as a probability.

In this example, deep learning network 302, $Conv_{n \times c \times s}$ is a convolutional filter (layer) with n inputs, c outputs and stride of s and ReLU is the rectified liner unit activation function. It is to be appreciated that other deep learning network architectures could also be used with more or fewer units in the convolution layer, different stride or activation function (e.g., leaky ReLU, tanh, PReLU) and/or one or more additional layers/operations (e.g., max/average pooling layer, data reduction layer, batch normalization, flattening). In some embodiments, the deep neural network 302 is implemented as a ResNet, Darknet, VGGNet, GoogleLeNet, AlexNet or MobileNet.

In some embodiments, the deep learning network is a trained neural network. In some embodiments, the neural network is trained for 300 epochs with a batch size of 128 using stochastic gradient descent with Nesterov momentum of 0.9 without dampening, and a weight decay of $10^{-4}$. In some embodiments, the learning rate is cosine-shaped reducing from 0.1 to 0. In some embodiments, synthetic data is used for training by simulating all possible conditions, including but not limited to: non-uniform lighting, complex background, artifacts and different types of balls and the combinations thereof.

In some embodiments, during the training, data augmentation is applied to the ball images that adjusts or modifies at least one of color, contrast, brightness, sharpness, shift, or noise level. In some embodiments, the augmentation level of color, contrast, brightness, sharpness is randomized ranging from 0.8 to 1.2, and spin rate is randomized ranging from 800 to 12000 rpm. In some embodiments, the ball images can be generated with random features such as dot, scratch, etc. In some embodiments, the maximum shift is 4 pixels, which is the maximum error caused by ball finding. In some embodiments, Gaussian blur with a sigma value that varies from 0.1 to 9.0 is applied to the ball images to add noise to the images.

In some embodiments, instead of directly using the ball images as the input for the deep neural network, the ball images are first pre-processed by feature subtraction between two images that is subsequently input to the deep learning network. This pre-processing step can be performed offline. In other embodiments, pre-processing is not performed so that the overall process is faster and can achieve higher accuracy for estimation than if preprocessing is applied.

FIG. 4 is a flow diagram of a process 400 for estimating spin axis and rate with deep learning, according to one or more embodiments. Process 400 can be implemented by, for example, the ball launch monitoring system 500, described in reference to FIGS. 5 and 6.

Process 400 includes, at a first time, training a deep learning network on a series of training images of spinning balls, each spinning ball having at least one feature point in a time series that forms a 3D circle in 3D space and a corresponding 2D ellipse image in a 2D plane (401); at a second time after the first time, capturing, with at least one camera, a series of images of a ball (402); predicting, with the trained deep learning network that has been trained as described above, spin measurements associated with the ball based on the series of images (403); determining, with at least one processor, a spin rate of the ball based on the spin measurements (404); determining, with the at least one processor, coefficients of a 2D ellipse model based on the spin measurements and the spin rate (405); and determining, with the at least one processor, a spin axis of the ball in 3D space based on the 2D ellipse model and the spin rate (406). Each of these steps was previously described in reference to FIGS. 2 and 3.

Figure 5:
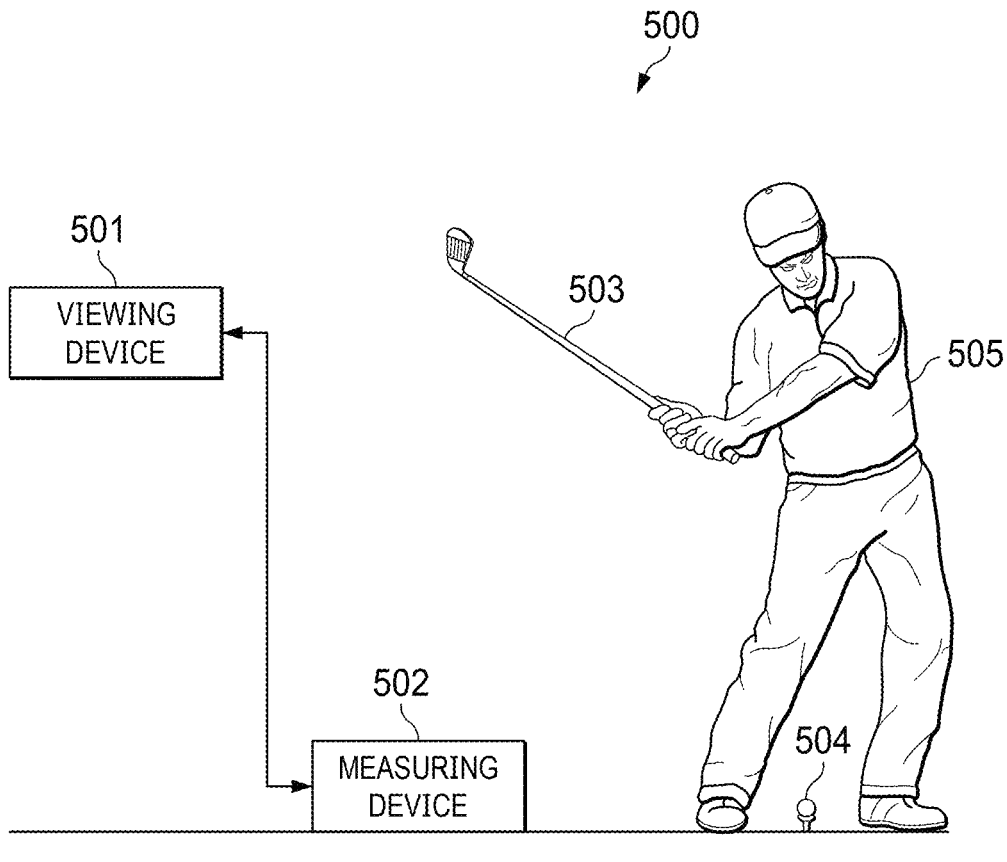
FIG. 5 is a block diagram of a ball launch monitoring system, which includes a measuring device that utilizes the process described in reference to FIGS. 2-4, according to one or more embodiments.

FIG. 5 is a block diagram of a ball launch monitoring system 500, which includes a measuring device 502 that utilizes the processes described in reference to FIGS. 2-4, according to one or more embodiments. Measuring device 502 can be positioned on the floor or ground behind user 505 (e.g., behind ball 504), who uses striking element 503 to strike ball 504. Processing of data can be further done through a cloud service. Viewing device 501 (e.g., computer or mobile device) is provided for user 505 or their coach to visualize the measurement results on a display screen (e.g., display screen of a computer or mobile device). Alternatively, or additionally, measuring device 502 may be positioned to a side of user 505.

Figure 6:
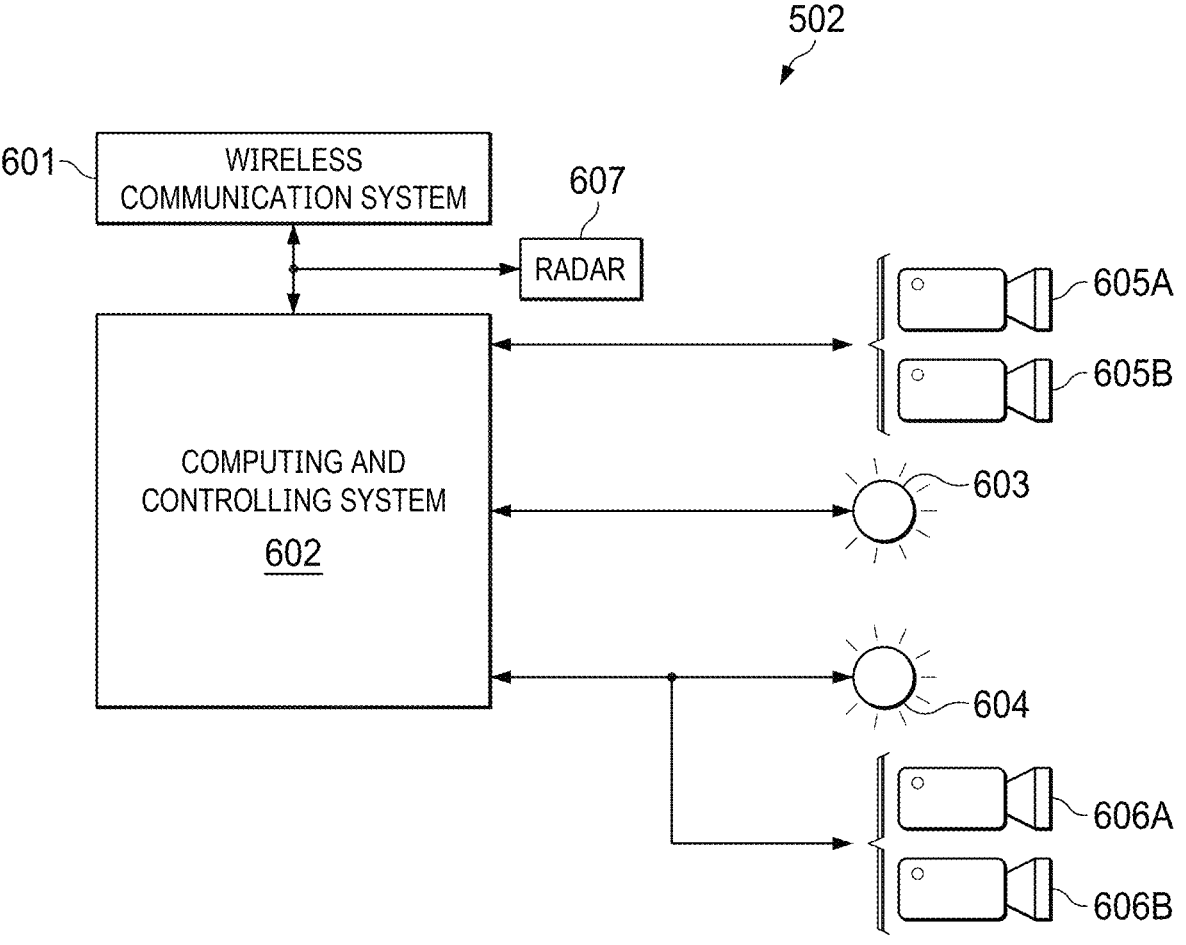
FIG. 6 is a block diagram of the measuring device of FIG. 5, according to one or more embodiments.

FIG. 6 is a block diagram of the measuring device 502 shown in FIG. 5, according to one or more embodiments. In some embodiments, measuring device 502 may include two sets of cameras. The first set of cameras includes two high-speed, low-resolution cameras 605A, 605B that form a first stereo system for measuring the movement of the bat and the ball during a swing of striking element 503 by user 505. The second set of cameras includes two high-resolution cameras 606A, 606B that form a second stereo system for measurement of the ball trajectory. In some embodiments, the second set of cameras may have a lower speed than the first set of cameras. In some embodiments, lighting system 603, 604 ensures properly lit images for 3D scanning of striking element 503, radar unit 607 provides timing and sequencing of images captured by cameras 605A, 605B, 606A, 606B, computing and controlling system 602 includes at least one processor to perform real-time processing of the captured images and radar signals, and wireless communication system 601 sends data to viewing device 501 shown in FIG. 5. Other suitable configuration of measuring device than measuring device 502 may also be used. For example, a measuring device comprising one set of camera can also be used.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A method comprising:

at a first time, training a deep learning network on a series of training images of spinning balls, each spinning ball having at least one feature point in a time series that forms a three-dimensional (3D) circle in 3D space and a corresponding two-dimensional (2D) ellipse image in a 2D plane;

at a second time after the first time, capturing, with at least one camera, a series of images of a ball;

predicting, with the trained deep learning network, spin measurements associated with the ball based on the series of images;

determining, with at least one processor, a spin rate of the ball based on the spin measurements;

determining, with the at least one processor, coefficients of a 2D ellipse model based on the spin measurements and the spin rate; and determining, with the at least one processor, a spin axis of the ball in 3D space based on the 2D ellipse model and the spin rate.

2. The method of claim 1, wherein the spin rate is computed from a norm of the spin measurements.

3. The method of claim 1, wherein the trained deep learning network generates a spin confidence score associated with the spin measurements.

4. The method of claim 3, wherein the deep learning network comprises n units, each unit including a convolutional filter followed by an activation function, and a fully connected layer for outputting the spin measurements and the spin confidence score.

5. The method of claim 4, wherein the activation function is a rectified linear unit (ReLU).

6. The method of claim 1, wherein the training images include different types of balls having different spin rates.

7. The method of claim 6, wherein the training images are augmented by at least one of color, contrast, brightness, sharpness, shift or noise level, non-uniform lighting or complex backgrounds.

8. The method of claim 6, wherein at least one of the training images is randomly augmented.

9. The method of claim 1, wherein the at least one feature point is a dot, scratch, dimple or seam on the ball.

10. The method of claim 1, further comprising:

creating a 2D ellipse image from the series of images; and inputting the 2D ellipse image into the trained deep learning network.

11. A system comprising:

at least one camera that captures a series of images of a ball;

at least one processor configured to:

predict, with a deep learning network, spin measurements associated with the ball based on the series of images, where the deep learning network is trained on a series of training images of spinning balls, each spinning ball having at least one feature point in a time series that forms a three-dimensional (3D) circle in 3D space and a corresponding two-dimensional (2D) ellipse image in a 2D plane;

determine a spin rate of the ball based on the spin measurements;

determine coefficients of a two-dimensional (2D) ellipse model based on the spin measurements and the spin rate; and determine a spin axis of the ball in three-dimensional (3D) space based on the ellipse model and spin rate.

12. The system of claim 11, wherein the spin rate is computed from a norm of the spin measurements.

13. The system of claim 11, wherein the trained deep learning network generates a spin confidence score associated with the spin measurements.

14. The system of claim 13, wherein the deep learning network comprises n units, each unit including a convolutional filter followed by an activation function, and a fully connected layer for outputting the spin measurements and the spin confidence score.

15. The system of claim 14, wherein the activation function is a rectified linear unit (ReLU).

16. The system of claim 11, wherein the training images include different types of balls having different spin rates.

17. The system of claim 16, wherein the training images are augmented by at least one of color, contrast, brightness, sharpness, shift or noise level, non-uniform lighting or complex backgrounds.

18. The system of claim 17, wherein at least one of the training images is randomly augmented.

19. The system of claim 16, wherein the at least one feature point includes at least one of a dot, scratch, dimple or seam on the ball.

20. The system of claim 11, further comprising:

creating a 2D ellipse image from the series of images; and inputting the 2D ellipse image into the trained deep learning network.

* * * * *